United States Patent
Ishida et al.

(10) Patent No.: US 10,957,104 B2
(45) Date of Patent: Mar. 23, 2021

(54) INFORMATION PROCESSING DEVICE, INFORMATION PROCESSING SYSTEM, AND INFORMATION PROCESSING METHOD

(71) Applicant: Sony Interactive Entertainment Inc., Tokyo (JP)

(72) Inventors: Takayuki Ishida, Tokyo (JP); Akio Ohba, Kanagawa (JP); Akihiko Sugawara, Kanagawa (JP); Yasuhiro Watari, Tokyo (JP); Akira Suzuki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 95 days.

(21) Appl. No.: 16/080,231

(22) PCT Filed: Feb. 21, 2017

(86) PCT No.: PCT/JP2017/006353
§ 371 (c)(1),
(2) Date: Aug. 27, 2018

(87) PCT Pub. No.: WO2017/163720
PCT Pub. Date: Sep. 28, 2017

(65) Prior Publication Data
US 2020/0090403 A1    Mar. 19, 2020

(30) Foreign Application Priority Data
Mar. 23, 2016  (JP) .............................. JP2016-058924

(51) Int. Cl.
*G06T 19/00* (2011.01)
*G06F 3/01* (2006.01)
*G06K 9/00* (2006.01)

(52) U.S. Cl.
CPC ............ *G06T 19/006* (2013.01); *G06F 3/012* (2013.01); *G06F 3/013* (2013.01);
(Continued)

(58) Field of Classification Search
CPC ........ G06T 19/006; G06F 3/012; G06F 3/013
See application file for complete search history.

(56) References Cited

U.S. PATENT DOCUMENTS

| 6,351,335 | B1 * | 2/2002 | Perlin | G02B 13/00 |
| | | | | 345/1.1 |
| 6,351,572 | B1 * | 2/2002 | Dufour | G06T 17/005 |
| | | | | 345/419 |

(Continued)

FOREIGN PATENT DOCUMENTS

| JP | 60198684 A | 10/1985 |
| JP | 2004272515 A | 9/2004 |

(Continued)

OTHER PUBLICATIONS

International Search Report for corresponding PCT Application No. PCT/JP2016/006353, 4 pages, dated May 9, 2017.

(Continued)

*Primary Examiner* — Sarah Lhymn
(74) *Attorney, Agent, or Firm* — Matthew B. Dernier, Esq.

(57) ABSTRACT

In an information processing device, a photographed image acquiring unit acquires an image which has been photographed by a camera attached to a head mount display. A region determining unit predicts a region which a user gazes at in a display image. An image analyzing unit has a first fineness processing unit and a second fineness processing unit, with the former analyzing a region corresponding to the gaze region in the photographed image with a higher fineness than the latter. An information processing unit performs
(Continued)

information processing by using the result of analysis. An image generating unit has a first fineness processing unit and a second fineness processing unit, with the former generating a display image on the gaze region with a higher fineness than the latter. An output unit sends data of the display image to the head mount display.

17 Claims, 9 Drawing Sheets

(52) U.S. Cl.
CPC ..... *G06K 9/00342* (2013.01); *G06K 9/00604* (2013.01); *G06T 2219/2021* (2013.01)

(56) References Cited

U.S. PATENT DOCUMENTS

| | | | |
|---|---|---|---|
| 9,274,597 B1* | 3/2016 | Karakotsios | G06F 3/0346 |
| 9,710,923 B2 | 7/2017 | Ohba | |
| 10,217,286 B1* | 2/2019 | Angel | G06F 3/011 |
| 2012/0154277 A1* | 6/2012 | Bar-Zeev | G02B 27/017 |
| | | | 345/158 |
| 2012/0154557 A1* | 6/2012 | Perez | H04N 21/47205 |
| | | | 348/53 |
| 2013/0300634 A1 | 11/2013 | White | |
| 2013/0328925 A1* | 12/2013 | Latta | G06F 3/013 |
| | | | 345/633 |
| 2014/0002616 A1* | 1/2014 | Ohba | G06T 7/194 |
| | | | 348/47 |
| 2014/0361977 A1 | 12/2014 | Stafford | |

FOREIGN PATENT DOCUMENTS

| | | |
|---|---|---|
| JP | 2004279031 A | 10/2004 |
| JP | 2011215968 A | 10/2011 |
| JP | 2012216006 A | 11/2012 |

OTHER PUBLICATIONS

Notification of Reason for Refusal for corresponding Japanese Patent Application Application No. 2016-058924, 6 pages, dated Jun. 11, 2019.

International Preliminary Report on Patentability for corresponding PCT Application No. PCT/JP2016/006353, 17 pages, dated Jul. 26, 2018.

Extended European Search Report for corresponding European Patent Application Application No. 17769766.1, 9 pages, dated Sep. 16, 2019.

* cited by examiner

F I G. 1
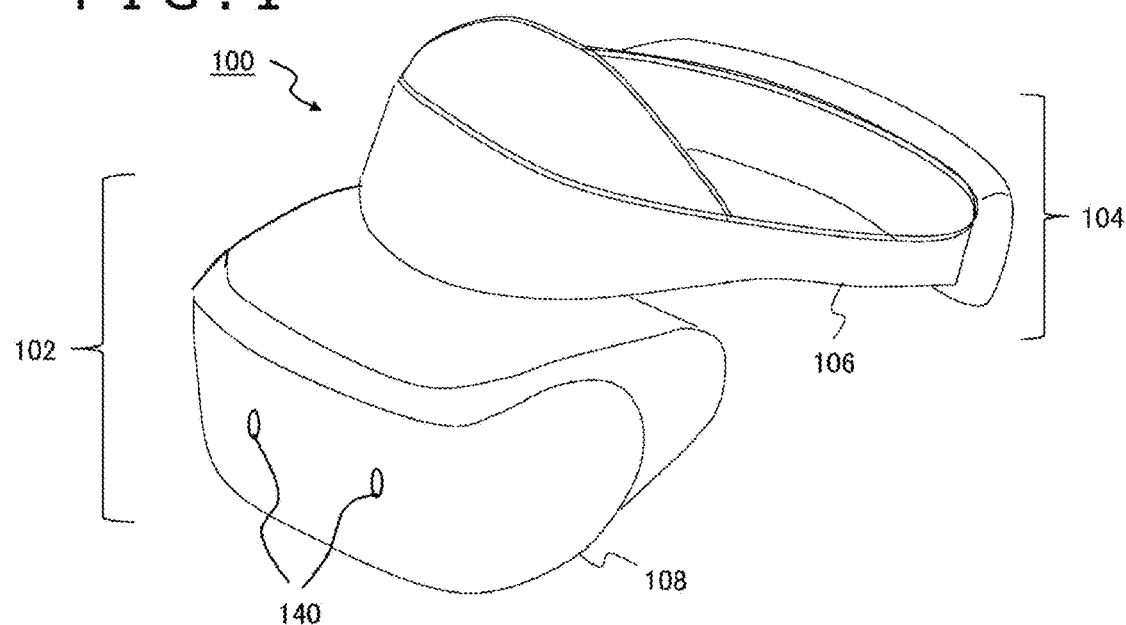
F I G. 2
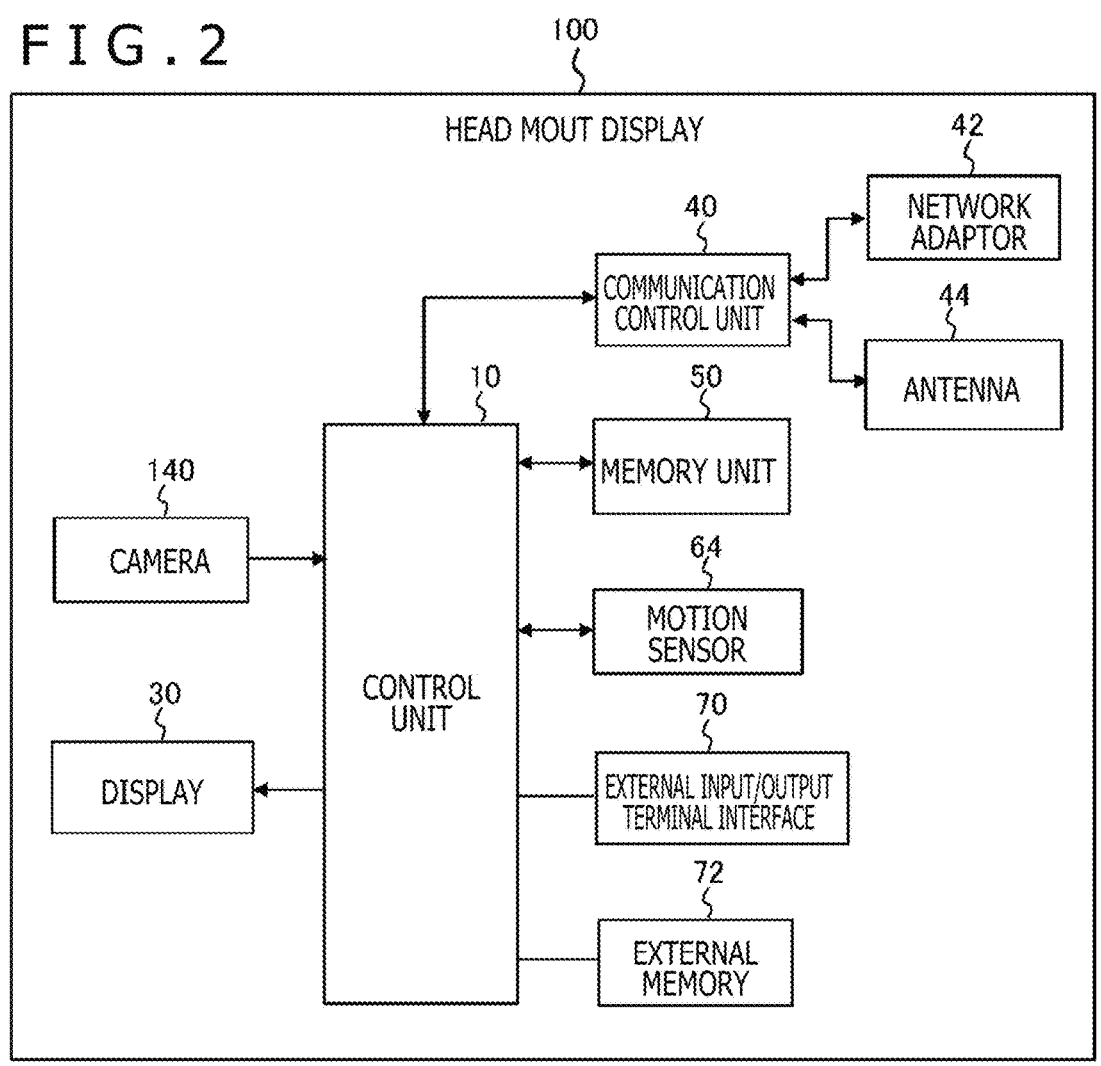

FIG.5
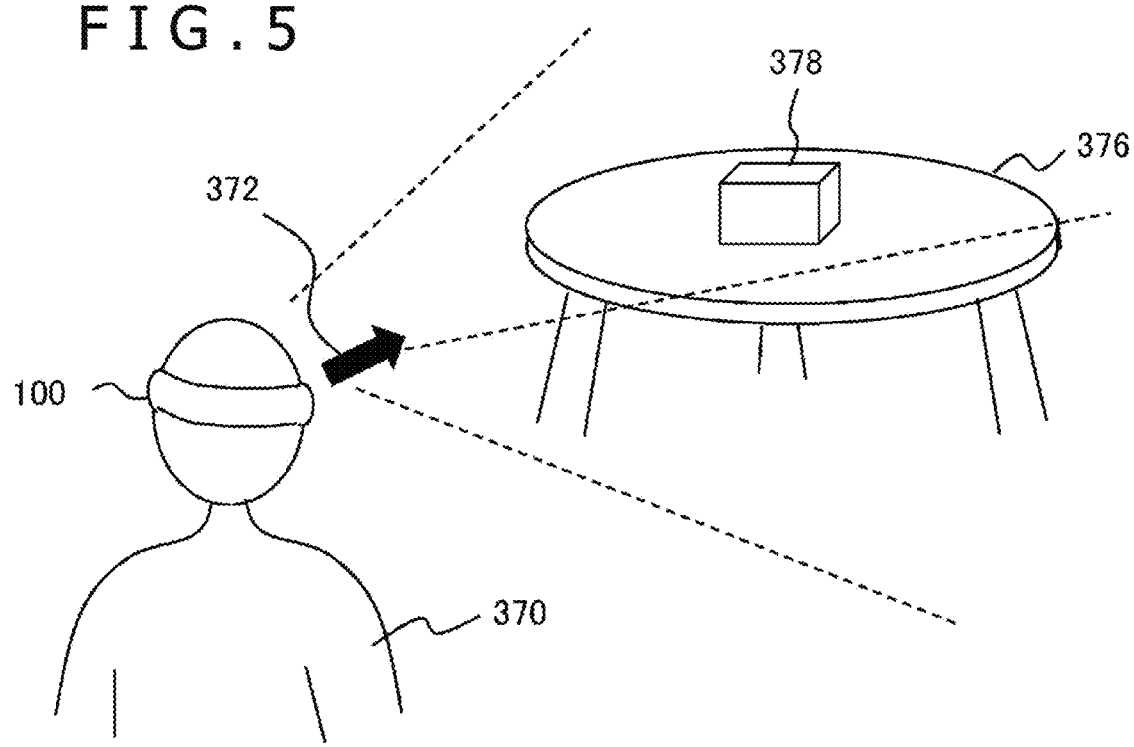
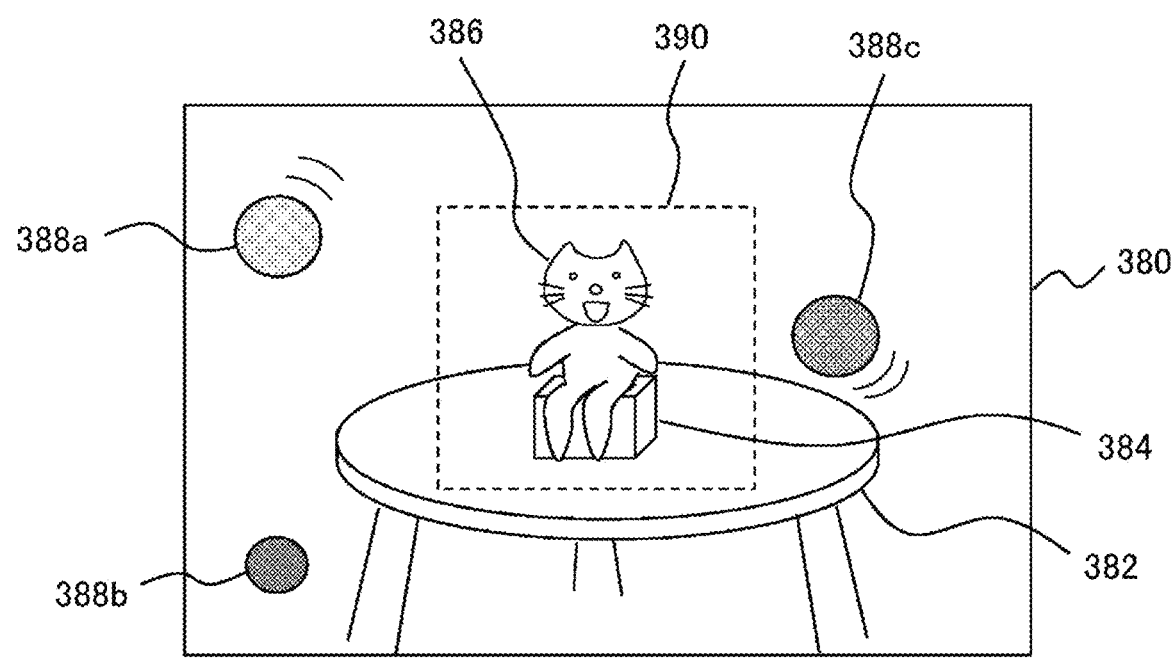
FIG.6

INFORMATION PROCESSING DEVICE, INFORMATION PROCESSING SYSTEM, AND INFORMATION PROCESSING METHOD

TECHNICAL FIELD

The present invention relates to an information processing device and an information processing system which carry out the information processing, the analysis of photographed images, and the generation of display images, and also to an information processing method to be practiced by the device and system.

BACKGROUND ART

There has been developed a new system which is capable of displaying panoramic images on the head mount display, with the panoramic images changing along the sight line as the user wearing it turns his or her head. The head mount display helps the user get himself or herself absorbed in images and makes applications (such as game) run more easily. There has also been developed a walk-through system that permits the user wearing the head mount display to walk around in the displayed virtual space as he or she physically moves.

SUMMARY

Technical Problems

The above-mentioned technology is required to work in such a way that the field of view of the display image constantly corresponds to the movement of the user's head and sight line so that the user strongly feels as if he or she is there and the user gets himself or herself deeply absorbed. The head mount display urgently needs timeliness, and this is common to any system so designed as to receive photographed images as input data and convert them immediately into display images. This requirement is not fulfilled in the case where it is necessary to realize the world of high-quality and attractive images, because any attempt for this purpose ends up with the necessity of complicated processing from data input to image display and the marked increase in data to be processed. The result is a delay in time required to display images, which causes the display images to lag from the actual movement, thereby giving the user a sense of discomfort. Thus, there exists a trade-off between the high-definition image processing and the timeliness of displaying.

The present invention was completed in view of the foregoing. It is an object of the present invention to provide a technology that makes the high-definition image processing and the timeliness of image display compatible with each other.

Solution to Problems

The above-mentioned problems is tackled by the information processing device which is disclosed in the embodiment of the present invention described below. The information processing device includes a photographed image acquiring unit that acquires data of a photographed image from a camera, an image analyzing unit that analyzes the photographed image, and a display image generating unit that generates a display image based on a result of the analysis and outputs it to a display device, in which at least one of the image analyzing unit and the display image generating unit causes processing fineness to vary depending on a region in an image plane.

Another embodiment of the present invention relates to an information processing system. This information processing system includes a head mount display provided with a camera, and an information processing device which generates an image to be displayed in the head mount display from an image photographed by the camera, in which the information processing device includes a photographed image acquiring unit that acquires data of the photographed image from the camera, an image analyzing unit that analyzes the photographed image, and a display image generating unit that generates a display image based on a result of the analysis and outputs it to the head mount display, and at least one of the image analyzing unit and the display image generating unit causes processing fineness to vary depending on a region in an image plane.

A further another embodiment of the present invention relates to an information processing method. The information processing method performed by an information processing device includes a step of acquiring from a camera data of a photographed image, a step of analyzing the photographed image, a step of generating a display image based on a result of the analysis, and a step of outputting data of the display image to a display device, with at least one of the analyzing step and the generating step causes processing fineness to vary depending on a region in an image plane.

Note that an arbitrary combination of the constituent elements and a matter obtained by converting the expression of the present invention between a method, a device, a system, a computer program, and the like are also effective as modes of the present invention.

Advantageous Effect of Invention

According to the present invention, it is possible to make the high-definition image processing and the timeliness of image display compatible with each other.

BRIEF DESCRIPTION OF DRAWINGS

FIG. 1 is an external view of a head mount display according to an embodiment of the present invention.

FIG. 2 is a diagram depicting functions which are accomplished by the head mount display according to the embodiment of the present invention.

FIG. 5 is a diagram to explain the relation between a real space and a display image according to the embodiment of the present invention.

FIG. 6 is a diagram to explain how a mode of processing is varied from one region to another in an image plane according to the embodiment of the present invention.

DESCRIPTION OF EMBODIMENT

Figure 3:
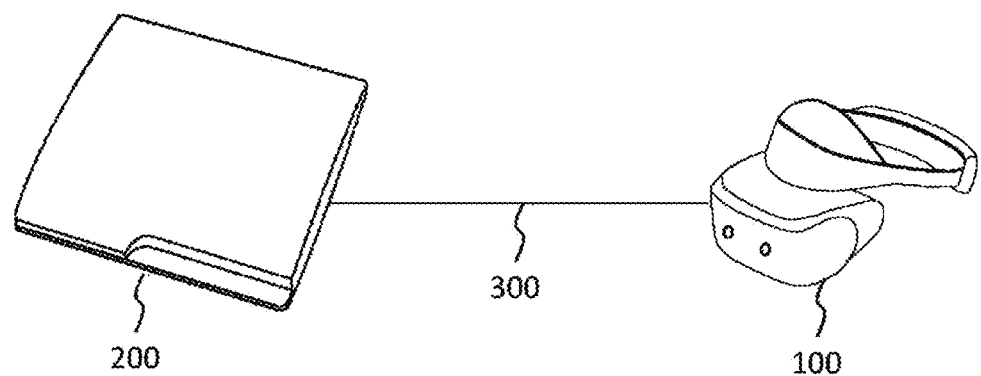
FIG. 3 is a diagram depicting a structure of an information processing system according to the embodiment of the present invention.

FIG. 1 depicts an example of an external appearance of a head mount display according to the present embodiment. In this example, a head mount display 100 includes an output unit 102 and a mounting unit 104. The mounting unit 104 includes a wearing band 106 which goes round the user's head to fix the unit when the user wears the unit. The wearing band 106 is made of a special material or has a special structure for the adjustment of length according to the size of the user's head. The material may be an elastic one, such as rubber. The desired structure may be achieved by using a buckle or gear.

The output unit 102 has a case 108 which is so formed as to cover the user's left and right eyes when the user wears the head mount display 100 on his or her head. Inside it is a display panel that faces the eyes of the user wearing it. The display panel is a liquid crystal panel or an organic EL (Electroluminescence) panel. The case 108 has therein a pair of lenses which exists between the display panel and the user's eyes when the head mount display 100 is worn, so that it expands the user's view angle. Also, the head mount display 100 may optionally have speakers or earphones at the position corresponding to the ears of the user wearing it.

The head mount display 100 is provided with a camera 140 on the front face of the output unit 102. The camera 140 has an imaging device, such as CCD (Charge Coupled Device) and CMOS (Complementary Metal Oxide Semiconductor), so that it photographs at a specified frame rate the field of view in a real space that corresponds to the direction of the face of the user wearing the head mount display 100. The head mount display 100 may be provided on its front face with one or two of the camera 140. The two cameras 140 may be arranged a certain distance apart in the lateral direction, so that they function as a stereo camera. In addition, the camera 140 is not specifically restricted in its position so long as it can photograph the user's front view.

The image photographed by the camera 140 may be used as at least part of the display image in the head mount display 100, and it may also be used as input data for image analysis necessary to generate a virtual world. The result of the instance in which the photographed image is used as the display image is that the user feels as if he or she sees the real space directly in front his or her eyes. The display image may be produced by making a picture of an object on the photographed image, the object staying on or reacting with a real body, such as a desk, within the field of view. In this way, it is possible to realize the AR (Augmented Reality).

The photographed image may be used to identify the position and posture of the user's head wearing the head mount display 100, so that the field of view is altered in response to them to make a picture of a virtual world. In this way, it is also possible to realize the VR (Virtual Reality).

The foregoing object is achieved by using the well-known technique called v-SLAM (Visual Simultaneous Localization and Mapping), which permits one to estimate the camera's position and posture from the photographed image.

How much the user's head inclines or turns may be measured by means of the motion senor attached to the inside or outside of the head mount display 100. Alternatively, the values measured by the motion sensor may be used to complement the results of analysis of the photographed image.

FIG. 2 is a diagram depicting functions which are accomplished by the head mount display 100. A control unit 10 is a main processor that processes such signals as image signals and sensor signals, command, and data and outputs the results of processing. The camera 140 supplies the control unit 10 with the data of photographed images. A display 30 is a liquid crystal display or the like, which receives image signals from the control unit 10 and displays them.

A communication control unit 40 sends out the data entered from the control unit 10 by means of wire or wireless communication through a network adaptor 42 or an antenna 44. The communication control unit 40 also receives data from the outside and sends them to the control unit 10 by means of wire or wireless communication through the network adaptor 42 or the antenna 44. A memory unit 50 temporarily stores data, parameters, and operation signals which are processed by the control unit 10.

A motion sensor 64 detects information on the rotational angle and inclination of the head mount display 100. The motion sensor 64 includes a gyrosensor, an acceleration sensor, an angular acceleration sensor, etc. which are properly combined together. An external input/output terminal interface 70 is an interface for connection to peripheral equipment such as USB (Universal Serial Bus) controller. An external memory 72 is exemplified by flash memory or the like. The control unit 10 supplies image and audio data to the display 30 and a headphone (not depicted) for their output; it also supplies image and audio data to the communication control unit 40 for transmission outwards.

FIG. 3 is a diagram depicting a structure of an information processing system according to the present embodiment. The head mount display 100 is connected to an information processing device 200 through a wireless communication or an interface 300 (such as USB) for connection with peripheral equipment. The information processing device 200 may be connected to a server through a network. In this case, the server may supply the information processing device 200 with on-line application, such as game in which a plurality of users can participate through a network. Moreover, the head mount display 100 may be connected to a computer or a portable terminal in place of the information processing device 200.

The information processing device 200 basically performs such action as to acquire the data of images photographed by the camera 140 attached to the head mount display 100, perform prescribed processing on the acquired data, thereby generating display images, and transmit the images to the head mount display 100. This process is repeated at a prescribed rate. As the result, the head mount display 100 displays a variety of images, such as AR and VR, covering the field of view corresponding to the direction of the user's face. The display thus produced may eventually be used for a game, virtual experience, and animation viewing for pleasure.

The information processing device 200 performs processing suitable for such individual purposes by using an ordinary known technique. The description that follows places emphasis on the method of acquiring information from photographed images which is necessary to achieve the foregoing object and also on the method of making a picture for the image to be displayed as the result.

Figure 4:
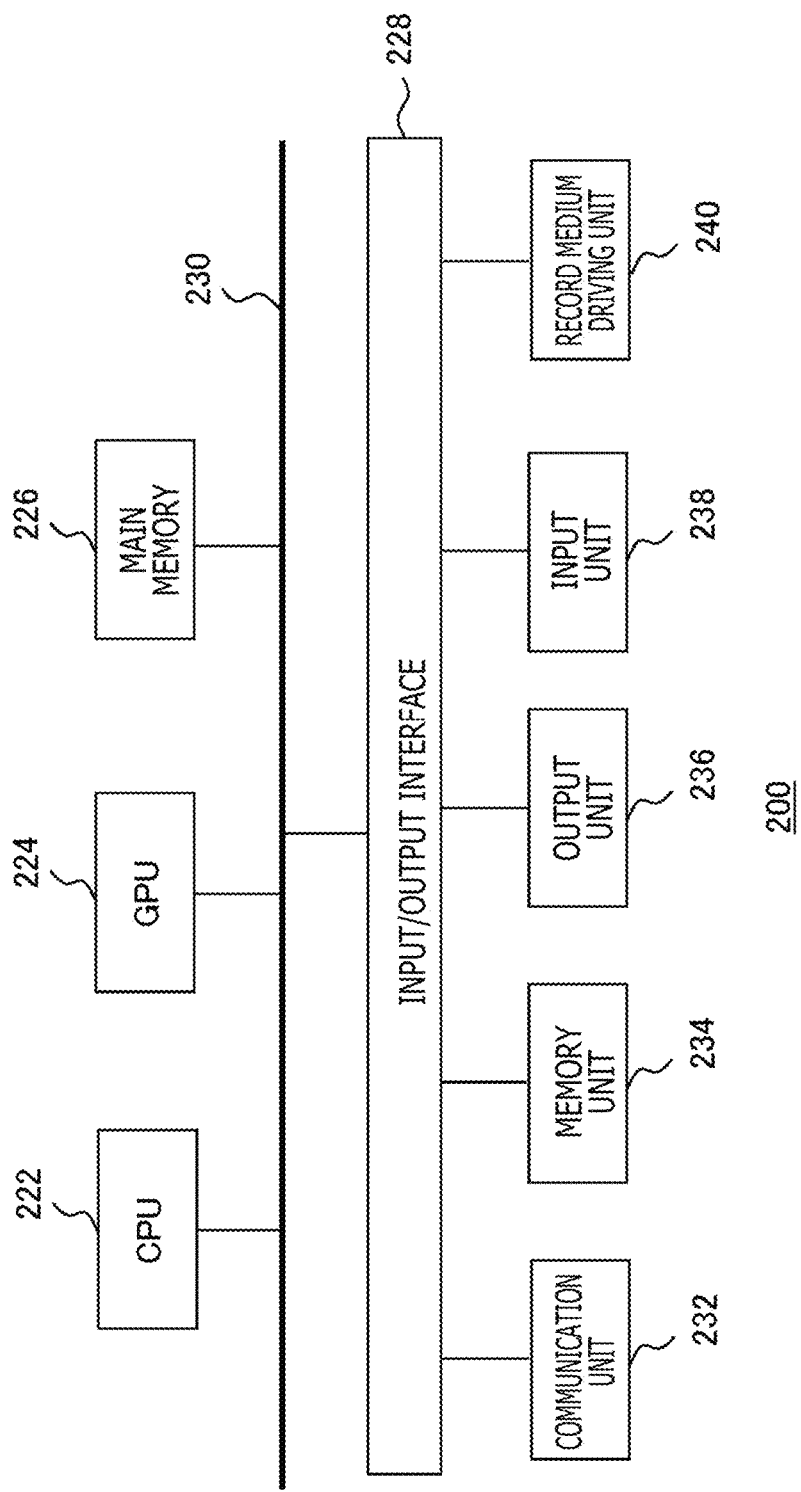
FIG. 4 is a diagram depicting a structure of an internal circuit of an information processing device according to the embodiment of the present invention.

FIG. 4 is a diagram depicting a structure of an internal circuit of the information processing device 200. The information processing device 200 includes a CPU (Central Processing Unit) 222, a GPU (Graphics Processing Unit) 224, and a main memory 226. These parts are connected together through a bus 230. The bus 230 is connected to an input/output interface 228.

The input/output interface 228 is connected to a communication unit 232 including an interface such as USB and IEEE1394 for peripheral equipment, and a network interface such as wired or wireless LAN (Local Area Network), a memory unit 234, such as hard disc drive and nonvolatile memory, an output unit 236 which outputs data to a display device, such as the head mount display 100, an input unit 238 to which data is entered from the head mount display 100, and a record medium driving unit 240 which drives a removable record medium such as magnetic disc, optical disc, or semiconductor memory.

The CPU 222 executes the operating system stored in the memory unit 234, thereby entirely controlling the information processing device 200. The CPU 222 also executes a variety of programs which have been read out from the removable record medium and loaded to the main memory 226 or which have been downloaded through the communication unit 232. The GPU 224 has both the function of geometry engine and the function of rendering processor, and it also executes the process of making a picture in response to the command from the CPU 222 and stores the display image in a frame buffer (not depicted). The GPU 224 further converts the display image stored in the frame buffer into video signals and outputs them to the output unit 236. The main memory 226 includes RAM (Random Access Memory) and stores programs and data necessary for processing.

FIG. 5 is a diagram to explain the relation between a real space and a display image in the present embodiment. It illustrates a situation in which a user 370 wearing the head mount display 100 is facing a real space including a table 376 and a box 378 placed thereon. The camera 140 attached to the head mount display 100 photographs the field of view or the space indicated by dotted lines, with the space having its center indicated by an arrow 372 which coincides with the direction in which the user is facing. The image being photographed changes in the field of view as the user's head changes in position and posture.

The information processing device 200 uses the images which have been photographed as mentioned above, thereby acquiring the position and posture of the user's head by means of v-SLAM as well as performing the processes as exemplified below.
1. To generate depth image
2. To perform three-dimensional modeling for real space
3. To calculate interaction between real body and virtual object
4. To pursue real body
5. To recognize images by matching
6. To make picture from computer graphics The term "depth image" used in Subparagraph 1 above denotes an image in which the distance from the camera to the object is expressed in terms of the pixel value of the corresponding image on the photographed image. For instance, assuming that the camera 140 is a stereo camera, corresponding points are extracted from the right and left parallax images which have been photographed, and the parallax between the two images is used to calculate the distance to the object based on the principle of triangulation. Even when the camera 140 is a single-lens camera, it is possible to calculate the distance to the object according to the size of the image in the photographed image if the shape and size of the object are made known or if a prescribed marker is attached.

The step mentioned in Subparagraph 2 above is intended to model the real body, which is the object to be photographed, as a calculated object in the three-dimensional space. For example, if the individual pixels of the depth image are inversely projected into the three-dimensional space based on the distance from the camera which is represented by the pixel values, it is possible to obtain the point cloud that discretely represents the surface of the real body. The result may be analyzed for individual units of the stereoscopic regions which are obtained by dividing the three-dimensional space, so that one can recognize the shape of individual real bodies. The resulting information on shape may be used to make a model representing the surface of a real body in terms of voxel value, octree, and polygon mesh, so that the resulting model can be used in the same way as the object of computer graphics. There are other methods for modeling the real body, and they are put in use by various techniques known to those who are skilled in the art.

What is mentioned in Subparagraph 3 above is intended for the processing to physically obtain the interaction between the modeled real body and the virtual object to be drawn by computer graphics. Suppose that one draws a picture of a ball as a virtual object, then one can realize an AR having reality by representing how the ball as a virtual object rolls and rebound on the table as a real body based on the accurate physical calculations that represent the movement.

Subparagraph 4 above denotes the process of tracing the movement of specific real bodies (such as the user's hands and another user's hands) on the photographed image, the process being intended for AR, gesture recognition, and fighting game. There are many practical techniques to trace figures on the image. Subparagraph 5 above denotes the process of matching with a template image which is performed for tracing and for recognition and detection of the real body. Subparagraph 6 above denotes the process of drawing an object on the photographed image or drawing a virtual world in the field of view corresponding to the position and posture of the user's head.

The information processing device 200 performs any one or more than any one in combination of the processes defined in Subparagraphs 1 to 6 above according to the images displayed on the head mount display 100 or the content of the information processing such as game. Although individual processes can be accomplished by means of ordinary techniques, they are liable to latency, which means the necessity for a long time from photographing to displaying, as the steps of processing increase and the processing with high fineness is required more than usual. This drawback is alleviated according to the present embodiment which is designed to perform processing differently for individual regions that result from division of an image plane or three-dimensional space, thereby achieving efficient processing with few adverse effects on viewing.

FIG. 6 depicts how a mode of processing is varied from one region to another in an image plane. An image 380 is an example of a display image in which AR is realized by using the image photographed in the environment depicted in FIG. 5. The image 380 depicts a cat object 386 and spherical objects 388a, 388b, and 388c, which are virtual objects, in the photographed image including an image 382 of a table as the subject and an image 384 of a box as the subject.

If the image depicted in FIG. 6 is generated and displayed continuously at a prescribed rate, it is possible to visualize a world in which the cat object 386 is sitting on the box and the spherical objects 388a, 388b, and 388c are floating and occasionally rebounding from the table. The photographed image in which the object is not yet drawn changes in coverage in response to the movement of the user's head. Therefore, the virtual objects should be drawn, with their position so adjusted as to conform to the change. This needs processing to generate the depth image mentioned in Subparagraph 1 above, to achieve the three-dimensional modeling mentioned in Subparagraph 2 above, to carry out the interaction calculations mentioned in Subparagraph 3 above, and to draw the computer graphics mentioned in Subparagraph 6 above.

To cope with the foregoing situation, it is necessary to improve the efficiency for steps before display. This object is achieved by performing the processes differently between a region 390 under the user's scrutiny and the other regions. In other words, the region 390 undergoes processing with high fineness and the other regions than the region 390 undergo processing with lower fineness than that for the region 390. The term "fineness" used above is a kind of processing parameter that affects the accuracy of the processing results and also affects the quality perceived by humans. It includes resolution, processing rate, unit of account, quantizing unit, approximation accuracy, processing fineness (spatial, temporal, and spatial-temporal), and processing algorisms differing in accuracy.

The processing for high fineness means to employ a finer processing unit either temporally or spatially or to employ an algorism that yields results with a higher accuracy. In general, the higher the fineness is, the higher the accuracy of the processing result is and the larger the processing load is. The processing mentioned above may be performed in a limited region that needs scrutiny so that the visual impression is improved without increasing the processing load. This can be accomplished for the image 380 by increasing the rate of generating the depth image only in the region 390 or by increasing the rate or resolution for modeling the box and table top included in the region 390.

There is another possible way in which the calculations for interaction are performed differently between the regions and the calculations are performed with finely divided units. For example, the calculations for interaction between the cat object 386 and the box in the region 390 may be performed at a higher rate than the calculations for interactions among the spherical objects 388a, 388b, and 388c in the other region. Furthermore, when the drawing of the picture of the cat object 386 is performed, the calculations for writing and shading may be performed with higher accuracy than the other region or the drawing may be performed with high resolution.

The differentiating of the fineness mentioned above may be performed by only one process or a plurality of processes. Although the image plane is divided into two regions in the case depicted in FIG. 6, it is also possible to divide the image plane into three or more regions and use three or more kinds of fineness. Also, there may be two or more regions to which the same fineness is applied. It is not always necessary for the regions to which high fineness is applied to have the common mode of processing. For example, even in the case where the region 390 is to undergo processing with high fineness, it is possible to adjust the rate of generating the depth image in the region according to the distance from the camera to the real body being photographed.

Figure 7:
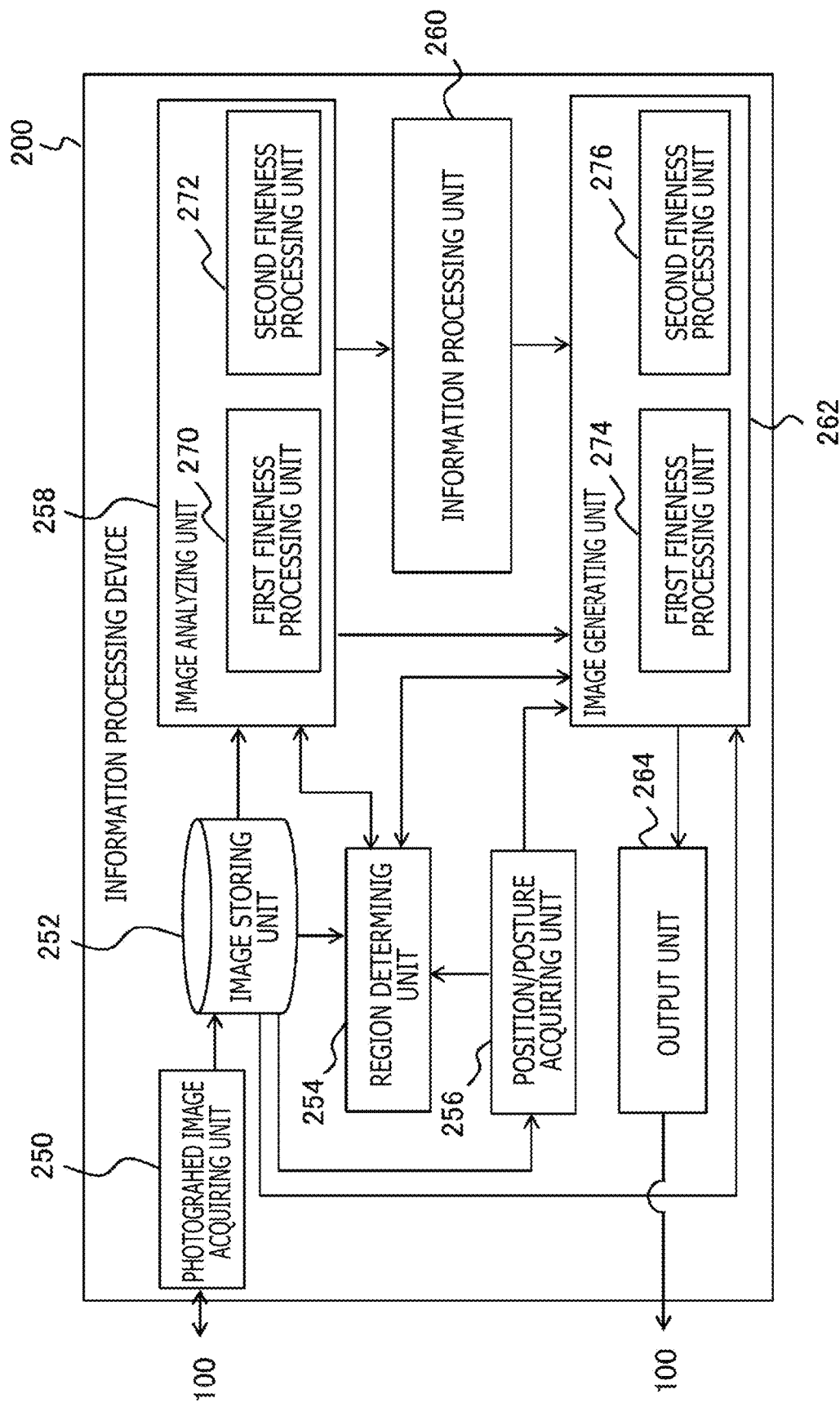
FIG. 7 is a block diagram depicting functional blocks of the information processing device according to the embodiment of the present invention.

FIG. 7 is a block diagram depicting functional blocks of the information processing device 200 according to the present embodiment. Incidentally, the information processing device 200 may have its functions partly moved to the control unit 10 of the head mount display 100. The functional blocks depicted in FIG. 7 may perform their functions as hardware if they are constructed of the CPU, GPU, and memories depicted in FIG. 4. Also, they may perform their functions as software if they are loaded with programs from memory such as recording medium for data entry, data keeping, image processing, and communication. The fact that the functional blocks can be variously constructed from hardware alone or software alone or from both, without restrictions, is understood by those who are skilled in the art.

The information processing device 200 includes a photographed image acquiring unit 250 which acquires data of a photographed image from the head mount display 100, an image storing unit 252 which stores the acquired data, a region determining unit 254 which determines regions varying in fineness, a position/posture acquiring unit 256 which acquires the position and posture of the head mount display 100 from the photographed image, an image analyzing unit 258 which analyzes the photographed image and acquires necessary information, an information processing unit 260 which performs information processing based on the result of image analysis, an image generating unit 262 which generates data of an image to be displayed as the result of information processing, and an output unit 264 which outputs the generated data.

The photographed image acquiring unit 250 acquires at a prescribed rate data of an image which has been photographed by the camera 140 on the head mount display 100; the photographed image acquiring unit 250 performs decoding and other necessary processes and stores the results in the image storing unit 252. In the case where the camera 140 is a stereo camera, the photographed image acquiring unit 250 acquires data of parallax images photographed from the right and left view points.

The region determining unit 254 determines regions for specified fineness so that the fineness varies from one process to another. One image frame undergoes processing which varies in fineness for the kind of process, the number of divisions of region, and the standard for division. The rules for them vary according to the content of information processing and display, the accuracy of processing required, and the performance of processing of the information processing device 200. The following description illustrates the processing which is performed in such a way that the region 390 which the user watches closely has a higher fineness than any other region, as depicted in FIG. 6.

Thus, the region determining unit 254 determines the region which the user watches closely in the display image. In the case where the image is displayed on the head mount display 100, the user naturally directs his or her face toward the object which he or she wants to watch. Since the camera 140 photographs the object to which the user directs his or her face, the region the user watches closely corresponds to the central part of the photographed image. Therefore, the region determining unit 254 designates the regions of specific size including the center on the photographed image plane as the region which the user watches closely.

Alternatively, the head mount display 100 may be provided inside with a gaze point detector so that it accurately measures the position in the display image which the user is closely watching. The gaze point detector is so designed as to detect the infrared ray, which is emanated from an infrared ray radiation mechanism and reflected by the pupil, thereby defining the direction of the pupil and detecting the gaze point. In this case, the region determining unit 254 acquires from the gaze point detector (not depicted) position information of the gaze point in the image plane and then assigns a region of specific size including the gaze point as a gaze region.

The region determining unit 254 may also assign as the gaze region a region which includes a specific object that appears in the photographed image and an object drawn in the display image. Suppose, for example, that the user produces an AR from virtual blocks with his or her own hands, it is presumed that the user watches the vicinity of his or her hand. In this case, the region determining unit 254 detects an image of the hand in the photographed image and assigns the region including it as the gaze region. Also, in the case of fighting game, in which another user as the other player is in front of the user, the gaze region may be the face or hand of another user. Detection of specific parts (such as hands and face) of the human body in the photographed image may be accomplished by means of the ordinary technique for pattern matching and features extraction.

Detection of hands may be made easier if a controller is attached which is provided with a marker having a specific color and size. The object for gaze is not restricted to parts of the human body. The object which a human gazes varies depending on the content of the image which is eventually displayed. For example, in the case of the display image depicted in FIG. 6, the user is likely to watch mainly the cat object 386 drawn in the image.

If the system is set up such that the cat object 386 is close to the box which is a real body, the region determining unit 254 may detect the box image 384 in the photographed image and assign as the gaze region the region (e.g., the region 390) including the box image 384 and the cat object 386 to be drawn later. It is possible to determine the gaze region according to the characteristics and positional relation of the real body, because of the fact that the table tends to attract attention more than the floor and wall and the near side of a room tends to attract attention more than the far side of a room, even in the case where the object is not drawn.

For this reason, the internal memory of the region determining unit 254 stores in advance the setting of real bodies and objects to be gazed with a high probability, or the rules to derive them for information on the content of information processing for a game to be played by using the photographed images, the scene of the display image world, the characteristics of goods, the positional relation of real bodies. For example, direct setting is possible for the characters and goods which attract attention easily in an electronic game in ordinary cases.

Alternatively, if the character displayed in the direction in which the user's face turns is recorded for individual users, it is possible to specify the character to which the user draws his or her attention most likely. In this case, the setting of such probability can be optimized for each user. Then, based on the information stored in the memory, the region determining unit 254 assigns as the gaze region that region which is watched closely in the actual photographed image with a high probability. For this purpose, the image analyzing unit 258 and the image generating unit 262 provide the necessary information such as the recognition and positional relation of the objects appearing in the photographed image, and the position where the object watched closely is to be drawn. The region determining unit 254 sends the information on the determined gaze region to the image analyzing unit 258 and the image generating unit 262.

Alternatively, the region determining unit 254 may predict the future gaze region based on the past movement of the gaze region in the frame. For example, the region determining unit 254 is able to predict the direction of the user's face at a future time corresponding to the frame, based on the past change with time of the direction of the user's face indicated by the arrow 372 in FIG. 5. Assuming that this direction overlaps the sight line, it is possible to specify the region to be gazed after a very short period of time; this permits the image analysis and drawing process to be performed with increased fineness for that part. This reduces the possibility that the gaze region moves during intermediate processing, such as image analysis, information processing, and image drawing, thereby making a discrepancy between the actual gaze region and the high-definition part in the display image.

In this case, the region determining unit 254 sequentially acquires information on the position and posture of the head from the position/posture acquiring unit 256, and records the history such as the vector representing the direction of the face as indicated by the arrow 372. Moreover, the region determining unit 254 predicts the gaze region after one frame by extrapolating the change with time of the vector that represents the direction of the face, and then supplies the results to the image analyzing unit 258 and the image generating unit 262. The image analyzing unit 258 and the image generating unit 262 perform high-definition process on the gaze region.

The process of predicting the gaze region by recording the history is not restricted to the instance in which the direction of the face is regarded as the sight line. In other words, in the case where the gaze point detector is employed, the past movement of the gaze point permits one to predict the future position of the gaze point. In the instance, too, in which the objects to be closely watched are specific parts of the human body, the specific real bodies, and the specific objects, it is possible to predict the future position from their change in position in the image plane. In any case, the same procedure can be applied to the process once the gaze region predicted as mentioned above is supplied to the image analyzing unit 258 and the image generating unit 262.

The position/posture acquiring unit 256 reads out the data of photographed image from the image storing unit 252, thereby acquiring the position and posture, in a real space, of the head mount display 100 by means of v-SLAM method and eventually acquiring the position and posture of the user's head wearing the head mount display 100. The image analyzing unit 258 reads out the data of photographed image from the image storing unit 252, thereby acquiring the specific information after analysis. The content of process varies depending on the purpose of information processing; it includes at least any one defined in Subparagraphs 1 to 5 above among those defined in Subparagraphs 1 to 6 above.

The image analyzing unit 258 includes a first fineness processing unit 270 and a second fineness processing unit 272, so that the image analyzing unit 258 performs the same processing as mentioned above, with fineness varied. In the case where the processing with high fineness is performed on the gaze region, the first fineness processing unit 270 performs processing with high fineness on the gaze region, and the second fineness processing unit 272 performs processing on the other regions than the gaze region with a lower fineness than that for the first fineness processing unit 270. However, depending on the content of processing or the algorism, the region to be processed by the second fineness processing unit 272 may include the region to be processed by the first fineness processing unit 270.

In other words, the foregoing may be modified from the standpoint of improving the processing efficiency such that the second fineness processing unit 272 performs processing with low fineness on the entire region of the photographed image, in which case the processing for the gaze region may be performed based on the results of processing performed by the first fineness processing unit 270 with high fineness. In the case where the image analyzing unit 258 performs image analysis, with the photographed image varied in spatial fineness, the results of analysis varying in fineness from region to region are supplied to the information processing unit 260 and the image generating unit 262 simultaneously for all the regions.

In the case where the fineness is varied with time, the results of analysis of the gaze region with high fineness are supplied at a higher rate than the results of analysis of other regions. The image analyzing unit 258 does not necessarily perform entire processing, with fineness varied; it may be possible that only the second fineness processing unit 272 is put to operation and the processing is performed with the same fineness on the entire regions.

The term "gaze region" is strictly defined as that region which the user closely watches in the displayed region. However, any region at the same position on the image plane also in the photographed image may be regarded as the gaze region in the case where the photographed image corresponds to the coverage of the display image as in the case of this embodiment. Nevertheless, this embodiment does not have its scope restricted to what is mentioned above; so long as the image analyzing unit 258 regards the region to be processed differently in the photographed image as the region corresponding to the gaze region in the display image, it does not matter that the positions of the two regions do not coincide with each other.

The information processing unit 260 utilizes the results of the analysis accomplished by the image analyzing unit 258 so as to perform the prescribed information processing. This information processing may be general one not directly relating with the photographed image; it includes the step of adding the elements of game to the display image or the step of interpreting the user's gesture so as to realize the prescribed function. The information processing unit 260 may have its function omitted in the case where the processing is completed only by the image analyzing unit 258 and the image generating unit 262, which are intended to display the object that interacts with the real body.

The image generating unit 262 generates the images representing the result of processing performed by the information processing unit 260 or the result of processing performed by the image analyzing unit 258. This process corresponds to the process defined by Subparagraph 6 above among the processes listed in Subparagraphs 1 to 6 above. The image generating unit 262 reads out the data from the image storing unit 252 in the case where the photographed image is used as the display image like AR. Then, the image generating unit 262 draws the object which corresponds to the three-dimensional model of the real body which has been acquired by the image analyzing unit 258 or which corresponds to the interaction calculation. Regardless of whether or not the photographed image is used for the display image, the image generating unit 262 acquires from the position/posture acquiring unit 256 the information on the position and posture of the head and then draws the image viewed from the view point corresponding to it.

The image generating unit 262 includes a first fineness processing unit 274 and a second fineness processing unit 276 so that the image generating unit 262 performs the identical drawing process with different fineness. In the case of drawing the gaze region with high fineness, the first fineness processing unit 274 performs drawing with high fineness for the object in the gaze region, and the second fineness processing unit 276 performs drawing with lower fineness than that for the first fineness processing unit 274 for the objects in other regions. There are several ways of drawing, with fineness varied depending on the regions. One way is to draw the object in the gaze region with much higher resolution than that of the original photographed image. Another way is to draw the object in the regions outside the gaze region with low resolution. Alternatively, it is also possible to alter the detailedness and algorithm for arithmetic operation necessary for drawing such as shading, or to alter the rate of drawing.

However, as far as the drawing process is concerned, the region for drawing by the second fineness processing unit 276 may include the region for drawing by the first fineness processing unit 274. As in the case of the image analyzing unit 258, an arrangement may be made so that the second fineness processing unit 276 draws entirely the display image from the standpoint of processing efficiency. In this case, the image with high fineness drawn by the first fineness processing unit 274 may be used for the gaze region. Only in the case where the display image varies in spatial detailedness, the display image varying in fineness from one region to another is supplied to the output unit 264 at the same timing over the entire regions.

In the case where the temporal fineness is made to vary, the display image of the gaze region is supplied at a higher rate than the display image of the other regions. Incidentally, it is not always necessary that the drawing fineness is made to vary; in this case, only the second fineness processing unit 276 is activated so that drawing is performed with the same fineness for the entire regions. In other words, it is only necessary that either the image analyzing unit 258 or the image generating unit 262 is made to vary in fineness from the gaze region to the other regions. In this way, it is possible to improve processing efficiency and display an image having reduced latency while maintaining the high quality of the visual image as much as possible.

The output unit 264 acquires the data of the display image from the image generating unit 262 and sends it to the head mount display 100. Moreover, the output unit 264, which has a buffer memory therein, combines the image of the gaze region with the image of the other region at an appropriate position, thereby producing the final display image. In the case where the second fineness processing unit 276 is to draw an image for the entire regions, the image for the gaze region among such images is produced by overwriting with the image drawn by the first fineness processing unit 274. Thus, the image generating unit 262 informs the output unit 264 also of the position information on the gaze region in the image plane.

In the case where the image of the gaze region is drawn at a higher rate, there occurs timing in which only the image of the gaze region is supplied from the image generating unit 262. In this case, the output unit 264 renews only the image of the gaze region among the images stored in the buffer memory just before and outputs the renewed one. In order to widen the field of view range, in the case of the head mount display which is constructed such that the user views through the lens the images displayed on the display, the output unit 264 performs, prior to output, inverse distortion correction on the display image so that the user views the image distorted by the lens as if it is a normal image.

Incidentally, the fineness may be varied in three or more steps. In this case, the image analyzing unit 258 and the image generating unit 262 may have the first and second fineness processing units supplemented with the third, fourth, . . . fineness processing units. The table below summarizes what has been mentioned above. It depicts the relationship between the processing performed by the image analyzing unit 258 and the image generating unit 262 and the items that can be modified so that the fineness is varied in each processing. However, they are not intended to restrict the processing necessary for image analysis and image drawing; there may be various objects for which the fineness is varied.

TABLE 1

| Items for processing | Object for which fineness is switched |
|---|---|
| Generation of depth image | Processing rate; resolution of image to be used for detection of corresponding point |
| Three-dimensional modeling | Processing rate; voxel size and mesh size |
| Interaction calculations | Processing rate; resolution of image to be used for arithmetic operation; unit of arithmetic operation |
| Tracing of entity | Processing rate |
| Detection of entity | Resolution of image to be used for matching |
| Drawing of object | Processing rate; detailedness of arithmetic operation; resolution of drawing |

Figure 8:
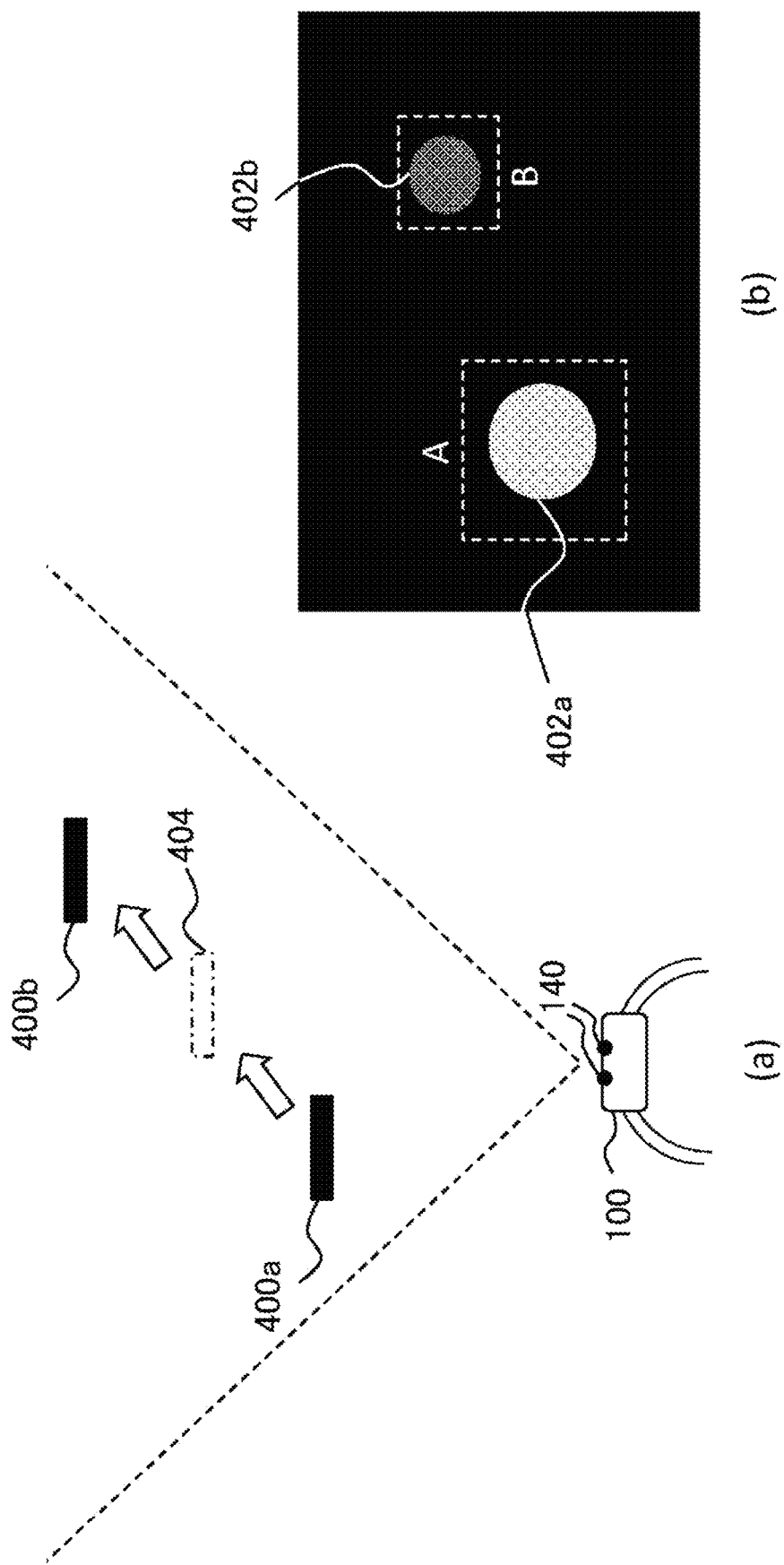
FIG. 8 is a diagram to explain an example of processing of causing an image analyzing unit to perform image analysis, with fineness varied according to the embodiment of the present invention.

FIG. 8 is a diagram to explain an example of processing of causing the image analyzing unit 258 to perform image analysis, with fineness varied. FIG. 8(a) is a bird's-eye view of the head mount display 100 and the real space in front of it. FIG. 8(b) is a schematic diagram depicting the depth image which the image analyzing unit 258 has acquired from the photographed image taken under the foregoing environment. It is assumed in FIG. 8(a) that real bodies 400a and 400b exist in the field of view, defined by dotted lines, of the camera 140, with the former being closer than the latter to the camera 140.

The camera 140, which is assumed to be a stereo camera, photographs the real space, so that the parallax gives the distance between each real body and the camera. The distance expressed in terms of the pixel value of the image on the photographed image yields the depth image as indicated in FIG. 8(b). The illustrated depth image increases in brightness as it approaches to the camera. That is, images 402a and 402b in the depth image correspond respectively to the real bodies 400a and 400b. Now, if the real body 400a is assumed to be the object which the user gazes, a region A is designated as the gaze region. On the other hand, if the real body 400b is assumed to be the object which the user gazes, a region B is designated as the gaze region. In an instance where the user gazes both the real bodies 400a and 400b, it may be possible to designate both the regions A and B as the gaze regions.

In any case, the image analyzing unit 258 analyzes the regions A and B more finely than any other regions. In this case, even when the real bodies 400a and 400b in the real space move at the same speed in parallel to the photographing plane, the photographed image, or the depth image in its turn, depicts such that the image 402a of the real body close to the user moves apparently faster than the image 402b of the real body far from the user. In consideration of this characteristics, the degree of fineness is properly adjusted depending on how far the real body is from the camera even through the real body is in the gaze region.

In other words, since the real body closer to the camera moves more between one frame to another, it is necessary to increase the rate of generating the depth images, thereby increasing the temporal fineness. On the other hand, since the real body closer to the camera has a larger parallax in the stereo camera, it is possible to reduce the resolution of the image to be used to extract the corresponding point for the parallax image, with the effect on the processing accuracy being limited. Consequently, the image analyzing unit 258 works for the region A in such a way that the photographed parallax image is reduced in size and the process of searching for the corresponding point by the unit of pixel is carried out at a higher rate.

Conversely, since any entity away from the camera has a small parallax, it is necessary to use an image with a high resolution in order to obtain an accurate distance, but it is slow in apparent moving speed and hence increasing the rate of generating the depth image has only a limited effect on the accuracy. Consequently, the image analyzing unit 258 performs the process of searching for the corresponding point for the region B at a lower rate than that for the region A, with the photographed image remaining unchanged in resolution. Incidentally, the searching may be performed by the subpixel unit which is smaller than the pixel unit.

Optimizing the resolution and processing rate with respect to balance between temporal fineness and spatial fineness according to the distance to the real body from the camera as mentioned above minimizes useless processing and reduces the effect on the processing accuracy and the appearance. Incidentally, the closer the real body is to the camera, the higher the possibility of the real body coming into collision with the user is, and hence it is desirable to obtain the position at a high rate for the real body close to the user. The table below depicts the result of establishing the processing accuracy in consideration of the distance to the real body in the gaze region in addition to whether or not the real body is inside or outside the gaze region.

TABLE 2

| Gaze region | Distance from camera | Processing rate | Resolution |
|---|---|---|---|
| Inside | Close | Large | Medium |
|  | Far | Medium | Large |
| Outside | — | Small | Small |

In other words, in the case, like the region A, in which the real body existing in the gaze region is closer than the prescribed threshold value, the depth image is generated at a high rate in the gaze region and the image to be used to search for the corresponding point is made to have an intermediate resolution. In the case, like the region B, in which the real body existing in the gaze region is positioned apart by equal to or farther than the prescribed threshold value, the depth image is generated at an intermediate rate in the gaze region and the image to be used to search for the corresponding point is made to have a higher resolution.

Not only the depth image is generated at a lower rate but also the image to be used to search for the corresponding point is made smaller outside the gaze region than inside the gaze region. In practice, "near" and "far" are substituted with the range of distance, and "large," "medium," and "small" are substituted with the processing rate and resolution in terms of definite value. In this table, the distance from the camera is divided into two steps and the processing rate and resolution are divided into three steps; however, finer division than this may be possible in practice.

The distance from the camera to the real body in the gaze region is specified by means of the depth image of the preceding frame. This process may also be accomplished by predicting the distance to the real body after a very short period of time from the change with time of the preceding position of the real body, as in the case of the gaze region. For example, suppose that the real body 400*a* alone exists in FIG. 8(*a*) and, after a very short period of time t, the real body 400*a* moves to the position of a real body 404, then it is possible to predict that the real body 400*a* is at the position of the real body 400*b* after further the very short period of time t. In this way, the region determining unit 254 is able to predict that the region B is the gaze region and also able to predict the distance from the camera to the real body to be viewed.

The image analyzing unit 528 utilizes the settings depicted in the table above, thereby adjusting the degree to which the fineness is varied according to the distance to the real body and also adjusting the balance between the processing rate and the resolution of the image to be used. Incidentally, the process of generating the depth image is not the only way to make the fineness vary in consideration of the position in three-dimensional space including not only the image plane but also the depthwise direction from the camera. An alternative way is possible if the real body is away from the camera in the gaze region and the processing is performed such that the fineness does not contribute much to the subsequent process and appearance. In this case, the difference in fineness with other regions may be reduced as the distance increases.

Figure 9:
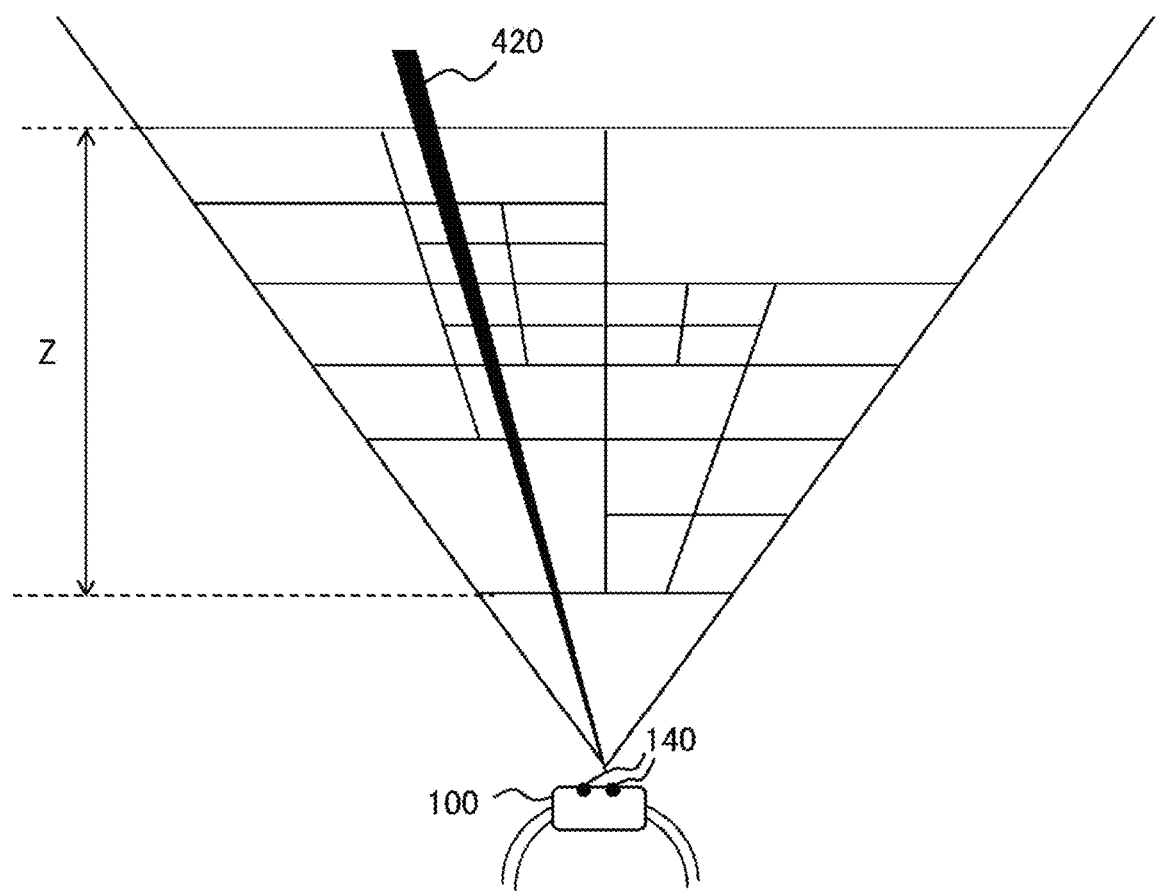
FIG. 9 is a diagram illustrating another example of processing of causing the image analyzing unit to perform image analysis, with fineness varied according to the embodiment of the present invention.

FIG. 9 is a diagram illustrating another example of processing of causing the image analyzing unit 258 to perform image analysis, with fineness varied. There have been proposed several methods for representing a solid body in the three-dimensional space. One of them is the octree representation which has been proposed to tackle the problems with the data size of the voxel representation. In the case of octree representation, a solid body is represented in terms of a set of regions which is eventually obtained by recursively repeating division until the regions which result from division of the space by octree do not span from inside to outside of a solid body.

The octree representation is basically intended to divide a cube constituting the space by three planes parallel to each plane passing through the middle point of each side, so that it eventually represents a solid body with a set of cubes differing in size. The method of representation in this manner is usually employed for the modeling of an entity which is given as a solid body in the global space. On the other hand, according to this embodiment, the object mentioned above is achieved by modeling and analyzing an entity in the real space based on the image which is photographed by the camera 140 of the head mount display 100. The octree representation is used to adapt to such a system. To be more concrete, this is achieved by dividing into eight the quadrangular pyramid which is formed by dividing the space for the field of view at a prescribed distance Z.

How to divide the space in this manner is schematically depicted in FIG. 9, which is an overhead view. The lines denote the boundary of division in the vertical direction. Division in the horizontal direction is also achieved as a matter of fact. That is, the space resembling a quadrangular pyramid constitutes the field of view of the camera 140. Then, this space is divided into eight by two vertical planes and one horizontal plane, each passing through the middle point of each side. Decision is made to see if each of the divided regions is inside or outside of the real body or extends over two real bodies. In the latter case, the division into eight is repeated. In this way, it is possible to represent the real body in terms of a set of regions each including quadrangular pyramids varying in size.

The photographed image is one which is formed on the imaging plane by the camera 140 from the coverage space which roughly assumes the quadrangular pyramid as a whole. In other words, the pixel on the photographed image represents the information of the entity in a region 420 depicted in FIG. 9. Therefore, if one wants to make the range of distance from the camera, which is based on the depth image, correspond to the region of the image on the image plane, the object is achieved highly accurately and highly efficiently by division into the quadrangular pyramids as depicted in the figure. If the gaze region on the image plane is assumed to be a rectangle, the region in the real space corresponding to it is also a quadrangular pyramid as a set of regions, like the region 420, which are arranged in the vertical and horizontal directions on the image. Consequently, it is possible to process efficiently only the gaze region with high fineness by dividing the space into quadrangular pyramids.

For example, in the region of the aggregate of quadrangular pyramids corresponding to the gaze region, an inside/outside decision is made more meticulously about the real body. This makes it possible to represent the real body accurately with smaller cones. Also, the processing may be varied in fineness by the unit of cone according to the distance from the camera based on the same principle as that by which the processing is varied in fineness according to the distance to the real body as explained above with reference to FIG. 8. For example, in the case where the real body is partly represented with the cone region, the cone beyond it does not appear on the image due to occlusion even though it represents the real body. Therefore, such a region, which might exist in the gaze region, can be excluded from what is analyzed by the image analyzing unit 258, or it is possible to eliminate the necessity of drawing the object to be drawn in such a region.

Figure 10:
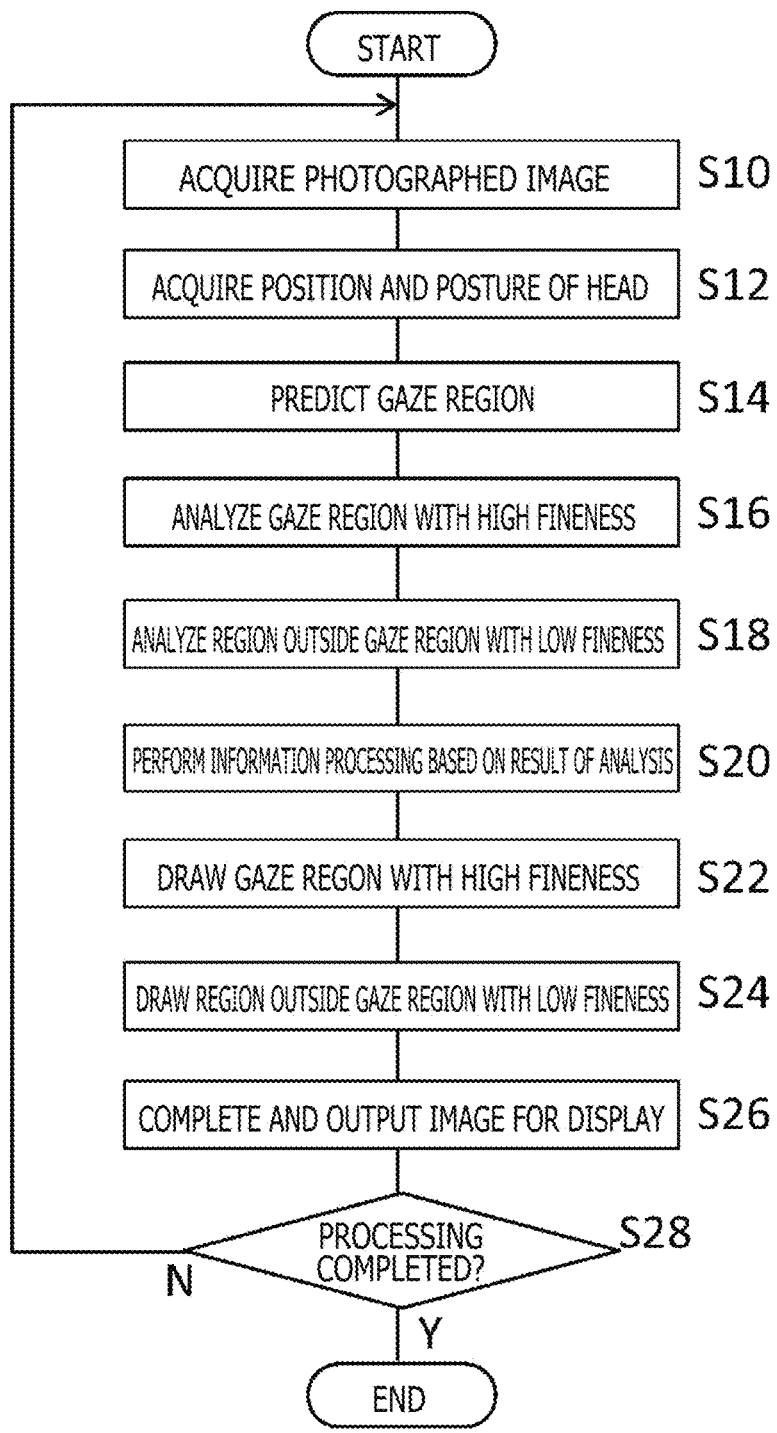
FIG. 10 is a flowchart which the information processing device according to the embodiment follows to generate a display image from a photographed image.

In order to realize the performance mentioned above, the information processing device 200 works as explained below. FIG. 10 is a flowchart which the information processing device 200 follows to generate a display image from a photographed image. This flowchart starts as soon as the user wears the head mount display 100 and enters the instruction to start the processing through prescribed input means (not depicted). First, the information processing device 200 causes the photographed image acquiring unit 250 to send a signal to the head mount display 100 so that the head mount display 100 starts photographing. In response to this signal, the photographed image acquiring unit 250 acquires data of a first frame of the photographed image which has been dispatched from the head mount display 100 (S10).

Then, the position/posture acquiring unit 256 acquires the position and posture of the head mount display 100 and, in its turn, the position and posture of the user's head, in response to the photographed image (S12), and the region determining unit 254 predicts the gaze region (S14). Incidentally, the process in S12 may be determined by the value measured by a motion sensor contained in the head mount display 100. In the case where the gaze region is predicted in S14 from the previous history, the gaze region may be assigned to the region which is regarded as the center of the image in the processing for the first frame.

Next, the first fineness processing unit 270 of the image analyzing unit 258 performs the prescribed image analyzing processing with a high fineness on the predicted gaze region (S16). At the same time, the second fineness processing unit 272 performs the similar processing to the first fineness processing unit 270 with a lower fineness than that for the first fineness processing unit 270 on the region outside the gaze region or the entire region of the image (S18). In the case of the processing without differentiation in fineness as mentioned above, the second fineness processing unit 272 may perform processing on the entire region.

Next, the information processing unit 260 performs the prescribed information processing with the help of the results of image analysis (S20). The processing may be replaced by the general information processing which does not need the differentiation of fineness as mentioned above. In some case, the input information may be entered by the input device (not depicted) operated by the user. Next, the image generating unit 262 generates the display image based on at least one of the result of image analysis by the image analyzing unit 258 or the result of information processing by the information processing unit 260.

At this time, the first fineness processing unit 274 of the image generating unit 262 draws the image with a high fineness for the predicted gaze region (S22). At the same time, the second fineness processing unit 276 draws the image with a lower fineness than that for the first fineness processing unit 274 for the region outside the gaze region or the entire region of the image (S24). However, in the case of image drawing without differentiation in fineness, the second fineness processing unit 276 draws the necessary image for the entire regions.

The output unit 264 joins together according to need the image of the gaze region and the image of the other regions, and then it outputs the result to the head mount display 100 (S26). The steps S10 to S26 are repeated for the subsequent frames for the period in which it is not necessary to terminate the processing by the user operation (N at S28) and all the steps are terminated when it is necessary to terminate the processing (Y at S28). Although all the steps are performed sequentially in the illustrated case, the steps of S16 and S22 are performed more frequently than the steps S18 and S24 in the case where the processing rate is to be increased in pursuit of high fineness.

According to the embodiment mentioned above, the step of converting the photographed image into the image to be displayed on the head mount display employs the image analyzing processing and image drawing processing which are performed with the fineness varied at least partly among the regions on the image. This object is achieved by increasing the fineness only in the region which the user watches closely; in this way it is possible to present the image world that gives a high-degree impression without the necessity of increasing the load of processing.

The gaze region is determined by the user's sight line to be presumed from the position and posture of the head mount display or from the result of detection by the gaze point detector. Alternatively, the object or real body which is viewed with a high probability is determined according to the general tendency or the individual user's tendency. In this case, how the sight line or gaze point varies with change with time is determined to predict the gaze region after a very short period of time. Despite the necessity for the image processing to take time, this reduces discrepancy between the actual gaze region for the display image and the region that needs processing with high fineness.

The increasing degree of fineness is properly adjusted according to the distance to the real body which has been photographed in the gaze region. For example, in the case where the real body exists at a short distance, the image with low resolution is used to generate the depth image at a high rate. In the case where the real body exists at a long distance, the image with high resolution is used to generate the depth image at a low rate. In both cases, processing with higher fineness than that outside the gaze region may be performed while keeping balance between the processing rate and the resolution, which produces a significant effect without the necessity for excessive processing.

Moreover, the modeling of the real body employs the technique that performs the octree representation in pyramid shape. In other words, the real body is represented by dividing the pyramid constituting the camera's coverage into eight parts to such an extent that each divided pyramid includes or not includes the real body completely. The spatial division of pyramids in this manner can extract the three-dimensional space corresponding to the region in the image in terms of a set of divided pyramids. Consequently, if the fineness is adjusted by regarding individual pyramids as a unit, it is possible to effectively increase the fineness without processing load for the space which is restricted by the region on the display image and the distance from the camera.

The foregoing is a description based on the embodiment of the present invention, which is a mere example and can be variously modified by those who are skilled in the art within the scope of the present invention, depending on combination of the constituents and processes.

For example, the embodiment of the present invention is based mainly on the assumption that the regions varying in fineness are divided according to whether or not the region is the user's gaze region. However, this is not the only criterion for division. For example, in the case of the head mount display which is constructed such that the display is viewed through lenses, the display image is distorted by the lenses and hence there would be difference in image density between the center and the periphery of the user's field of view. With such optical characteristics taken into consideration, it is necessary to correct the distortion in the reverse direction to perform processing differently between the center and the periphery of the display image as in the embodiment mentioned above. This permits one to view through lenses the entire field of view uniformly.

The embodiment mentioned above permits the image analyzing unit and the image generating unit to increase the fineness for processing the common gaze region in the case where there is the field of view for the photographed image and display image corresponding to each other. This leads to a synergistic effect of improving the quality of that region. On the other hand, the fact that the image analyzing unit and the image generating unit are capable of processing independently makes it possible to independently determine the region in which the former increases the fineness for the photographed image and the region in which the latter increases the fineness for the display image. Consequently, it would be possible to modify the image analyzing unit and the image generating unit such that they vary in fineness for the regions determined by different standards.

With the foregoing taken into consideration, correspondence is not always necessary between the field of view of the photographed image and the field of view of the display image. Although it is assumed in the foregoing embodiment that the head mount display is provided with a camera, it would be possible to place the head mount display and the camera in separate enclosures depending on the purpose of information processing and the content to be displayed. This produces the similar effect to the foregoing embodiment if the image analyzing unit and the image generating unit perform independently from each other the image processing with the different fineness on the regions which are determined independently as mentioned above, even though there is no relationship in the field of view between the photographed image and the display image. The display device is not limited to the head mount display; it may be substituted with any flat-panel display.

Figure 11:
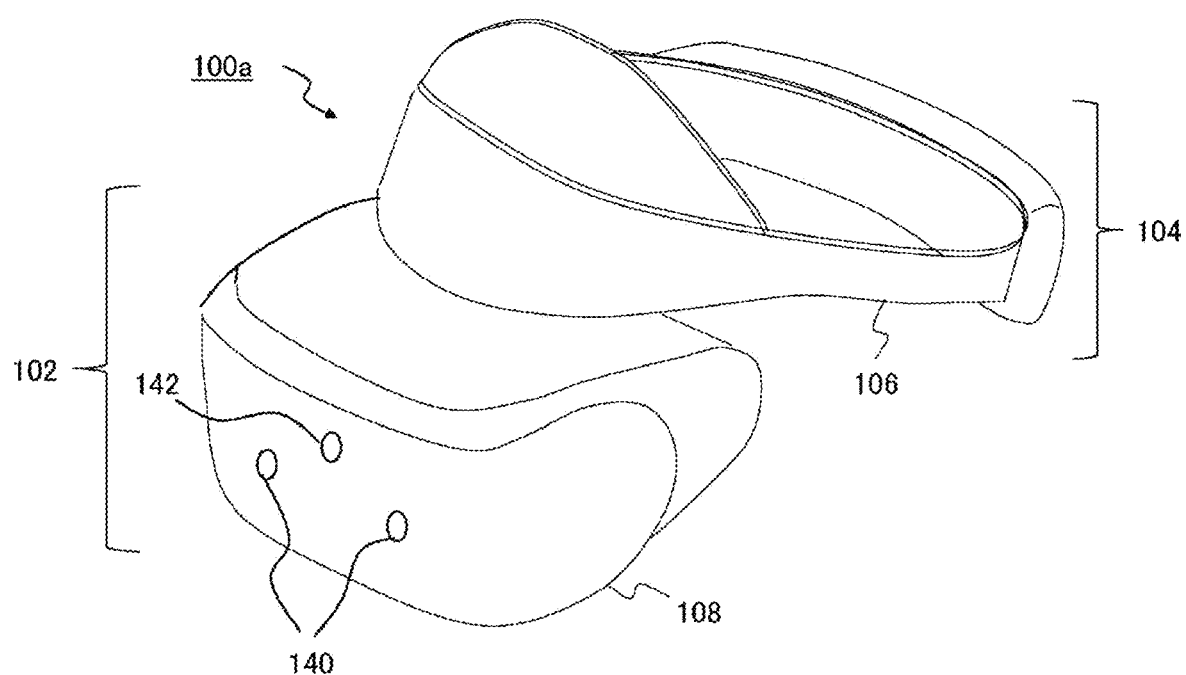
FIG. 11 is a view depicting an example of an external appearance of the head mount display provided with cameras to photograph two kinds of images according to a modified embodiment.

The embodiment mentioned above is designed such that the same photographed images obtained as the input data are made to vary in fineness by dividing the regions on the image plane. On the other hand, it may be possible to acquire several kinds of photographed images differing in fineness spatially or temporally or both as the input data. FIG. 11 depicts an example of an external appearance of the head mount display provided with cameras to photograph two kinds of images. In this case, a head mount display 100a is configured such that the head mount display 100 depicted in FIG. 1 is further provided with a second camera 142.

The lens of the second camera 142 is arranged on the vertical line passing through the middle point of the two lenses of the stereo camera constituting the camera 140. The second camera 142 is supposed to be a camera which has a wider field of view than each unit constituting the camera 140. In the case where the cameras have approximately the same number of pixels, the image photographed by the second camera 142 has a lower resolution than the image photographed by the camera 140 from their respective view points. The image photographed by the second camera 142 as defined above is processed by the second fineness processing units 272 and 276 and the image photographed by the camera 140 is processed by the first fineness processing units 270 and 274, then it is possible to produce the similar effect to the embodiment mentioned above.

Since the regions which undergo processing with a high fineness are limited, it is possible to reduce production cost by reducing the number of pixels for the camera 140 or it is also possible to increase the resolution by narrowing the field of view while keeping the number of pixels unchanged. The similar principle to the above may be used in the case where the second camera 142 photographs at a lower rate than the camera 140 and the resulting images are processed by the second fineness processing units 272 and 276 with a lower temporal resolution.

REFERENCE SIGNS LIST

100 Head mount display, 140 Camera, 200 Information processing device, 222 CPU, 224 GPU, 226 Main memory, 250 Photographed image acquiring unit, 252 Image storing unit, 254 Region determining unit, 256 Position/posture acquiring unit, 258 Image analyzing unit, 260 Information processing unit, 262 Image generating unit, 264 Output unit, 270 First fineness processing unit, 272 Second fineness processing unit, 274 First fineness processing unit, 276 Second fineness processing unit

INDUSTRIAL APPLICABILITY

The present invention described above is able to be applied to a variety of information processing devices, such as game device, image processing device, image reproducing device, and personal computer, and also to a variety of information processing systems including them.

The invention claimed is:

1. An information processing device comprising:
a photographed image acquiring unit that acquires data of a plurality of sequentially photographed images from a camera; the photographed images including first and second real world objects;
an image analyzing unit that analyzes the photographed images to identify the real world objects and analyzes the objects by modeling the objects;
a display image generating unit that generates a plurality of sequential display images based on a result of the analysis and outputs the display images to a display device, the display images including the real world objects; and
a region determining unit that determines, as being in a user's gaze region in the display images, the first real world object, and determines, as being in a region outside the user's gaze region in the display images, the second real world object;
wherein the image analyzing unit causes the objects to be analyzed at an increased object modeling processing rate for regions corresponding to the gaze region than at an object modeling processing rate for regions corresponding to the outside region; and
wherein the display image generating unit generates the display images using a higher calculation rate for simulating, through a sequence of the display images, physical motion interactions between the first real world object and a first virtual object, than a calculation rate for simulating, through the sequence of the display images, physical motion interactions between the second real world object and a second virtual object.

2. The information processing device according to claim 1, wherein
the image analyzing unit causes the photographed images to be analyzed with greater accuracy for the regions corresponding to the gaze region and including the other real world objects than accuracy for other regions.

3. The information processing device according to claim 1,
wherein the display image generating unit performs processing with greater accuracy for the gaze region than accuracy for other regions.

4. The information processing device according to claim 1, wherein the region determining unit predicts the gaze region at a later time based on temporal change of a parameter that determines the gaze region.

5. The information processing device according to claim 1, wherein the region determining unit determines the gaze region based on movement of a user's head which wears a head mount display as the display device.

6. The information processing device according to claim 1, wherein the region determining unit determines the gaze region based on a result of detection by a gaze point detector arranged inside a head mount display as the display device.

7. The information processing device according to claim 1, wherein the region determining unit specifies, based on past records, among regions which appear in the display images, which of the regions attracts close attention with a high probability and also determines, as the gaze region, a region including the regions which attract close attention with a high probability.

8. The information processing device according to claim 1, wherein the image analyzing unit makes at least one of spatial accuracy and temporal accuracy vary from one region to another in the photographed images.

9. The information processing device according to claim 1, wherein the image analyzing unit varies degree to which accuracy is varied depending on distance from the camera to a real body appearing in each region on the photographed images.

10. The information processing device according to claim 9, wherein the image analyzing unit varies, depending on the distance from the camera to the real body, balance between a rate of processing to generate a depth image including the images in the photographed images and resolution of a parallax image to be used for the generating process.

11. The information processing device according to claim 9,
wherein the region determining unit predicts, based on movement of the real body, a predicted region and a predicted distance, the predicted region including the images in the photographed images, the predicted distance being a distance from the camera to the real body, and
the image analyzing unit varies, based on the predicted distance, a degree to which accuracy for analysis is varied for the predicted region.

12. The information processing device according to claim 1, wherein the image analyzing unit repeats, based on a positional relation with the real body, processing of dividing into eight a quadrangular pyramid constituting the field of view of the camera by two vertical planes passing through the middle point of each line and one horizontal plane, thereby producing a model that represents a real body with a set of quadrangular pyramids and causing accuracy for analysis to vary in the unit of the quadrangular pyramid.

13. The information processing device according to claim 1, wherein the image analyzing unit causes a rate for analysis to vary from one region to another in the photographed images.

14. The information processing device according to claim 1, wherein the image analyzing unit performs analysis by using algorithms that vary in accuracy from one region to another in the photographed images.

15. An information processing system comprising:
a head mount display provided with a camera; and
an information processing device which generates a plurality of sequential display images to be displayed on the head mount display from a plurality of sequentially photographed images photographed by the camera,
wherein the information processing device includes
a photographed image acquiring unit that acquires data of the plurality of sequentially photographed images from the camera; the photographed images including first and second real world objects,
an image analyzing unit that analyzes the photographed images to identify the real world objects and analyzes the objects by modeling the objects, and
a display image generating unit that generates the plurality of sequential display images based on a result of the analysis and outputs the display images to the head mount display, the display images including the real world objects, and
a region determining unit that determines, as being in a user's gaze region in the display images, the first real world object, and determines, as being in a region outside the user's gaze region in the display images, the second real world object;
the image analyzing unit causes the objects to be analyzed at an increased object modeling processing rate for regions corresponding to the gaze region than at an object modeling processing rate for regions corresponding to the outside region; and
wherein the display image generating unit generates the display images using a higher calculation rate for simulating, through a sequence of the display images, physical motion interactions between the first real world object and a first virtual object, than a calculation rate for simulating, through the sequence of the display images, physical motion interactions between the second real world object and a second virtual object.

16. An information processing method performed by an information processing device, comprising:
acquiring from a camera data of a plurality of sequentially photographed images; the photographed images including first and second real world objects;
analyzing the photographed images to identify the real world objects and analyzing the objects by modeling the objects;
generating a plurality of sequential display images based on a result of the analysis; and
outputting data of the display images to a display device, the display images including the real world objects; and
determining, as being in a user's gaze region in the display images, the first real world object, and determining, as being in a region outside the user's gaze region in the display images, the second real world object;
wherein the analyzing causes the objects to be analyzed at an increased object modeling processing rate for regions corresponding to the gaze region than at an object modeling processing rate for regions corresponding to the outside region; and
wherein the generating generates the display images using a higher calculation rate for simulating, through a sequence of the display images, physical motion interactions between the first real world object and a first virtual object, than a calculation rate for simulating, through the sequence of the display images, physical motion interactions between the second real world object and a second virtual object.

17. A non-transitory, computer readable storage medium containing a computer program, which when executed by a computer causes the computer to carry out actions, comprising:
acquiring from a camera data of a plurality of sequentially photographed images; the photographed images including first and second real world objects;
analyzing the photographed images to identify the real world objects and analyzing the objects by modeling the objects;
generating a plurality of sequential display images based on a result of the analysis; and
outputting data of the display images to a display device, the display images including the real world objects; and,
determining, as being in a user's gaze region in the display images, the first real world object, and determining, as being in a region outside the user's gaze region in the display images, the second real world object;
wherein the analyzing causes the objects to be analyzed at an increased object modeling processing rate for regions corresponding to the gaze region than at an object modeling processing rate for regions corresponding to the outside region; and
wherein the generating generates the display images using a higher calculation rate for simulating, through a sequence of the display images, physical motion interactions between the first real world object and a first virtual object, than a calculation rate for simulating, through the sequence of the display images, physical motion interactions between the second real world object and a second virtual object.

\* \* \* \* \*